(12) United States Patent
Koga et al.

(10) Patent No.: US 10,008,326 B2
(45) Date of Patent: Jun. 26, 2018

(54) MULTILAYER CERAMIC ELECTRONIC COMPONENT HAVING AN INORGANIC MATTER AT AN INTERFACE BETWEEN AN EXTERNAL ELECTRODE AND THE CERAMIC BODY

(71) Applicant: Murata Manufacturing Co., Ltd., Nagaokakyo-shi, Kyoto-fu (JP)

(72) Inventors: Seiji Koga, Nagaokakyo (JP); Takashi Omori, Nagaokakyo (JP); Jun Ikeda, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 46 days.

(21) Appl. No.: 15/067,618

(22) Filed: Mar. 11, 2016

(65) Prior Publication Data

US 2016/0196920 A1  Jul. 7, 2016

Related U.S. Application Data

(63) Continuation of application No. PCT/JP2014/072595, filed on Aug. 28, 2014.

(30) Foreign Application Priority Data

Sep. 27, 2013  (JP) ................................ 2013-201674

(51) Int. Cl.
*H01G 4/12* (2006.01)
*H01G 4/30* (2006.01)
(Continued)

(52) U.S. Cl.
CPC ......... *H01G 4/1245* (2013.01); *H01G 4/0085* (2013.01); *H01G 4/012* (2013.01);
(Continued)

(58) Field of Classification Search
CPC ...... H01G 4/1245; H01G 4/248; H01G 4/012; H01G 4/1227; H01G 4/0085; H01G 4/2325; H01G 4/30; H01G 4/232
See application file for complete search history.

(56) References Cited

U.S. PATENT DOCUMENTS 5,781,402 A * 7/1998 Fujiyama .............. B22F 1/0007
                                                         361/305
8,518,844 B2 * 8/2013 Ikeda .................. C04B 35/4682
                                                         361/321.4

(Continued)

FOREIGN PATENT DOCUMENTS

JP  H06-309921 A  11/1994
JP  H09-190950 A   7/1997
(Continued)

OTHER PUBLICATIONS

International Search Report issued for PCT/JP2014/072595, dated Dec. 9, 2014.
(Continued)

*Primary Examiner* — David M Sinclair
(74) *Attorney, Agent, or Firm* — Arent Fox LLP

(57) ABSTRACT

A multilayer ceramic electronic component in which an interface of an edge region of an external electrode that extends around to a side surface of a ceramic body and the ceramic configuring a surface of the ceramic body, an inorganic matter is present containing 26 mol % or more and less than 45 mol % of $SiO_2$ and having a molar ratio $(TiO_2+ZrO_2)/(SiO_2+TiO_2+ZrO_2)$ of 0.154 or more, or an inorganic matter is present containing 45 mol % or more of $SiO_2$ and having a molar ratio $(TiO_2+ZrO_2)/(SiO_2+TiO_2+ZrO_2)$ of 0.022 or more. Furthermore, the inorganic matter may contain $B_2O_3$ having a molar ratio relative to $SiO_2$ within $0.25 \leq B_2O_3/SiO_2 \leq 0.5$.

6 Claims, 3 Drawing Sheets

(51) Int. Cl.
*H01G 4/232* (2006.01)
*H01G 4/008* (2006.01)
*H01G 4/012* (2006.01)
*H01G 4/248* (2006.01)

(52) U.S. Cl.
CPC ........... *H01G 4/1227* (2013.01); *H01G 4/232* (2013.01); *H01G 4/2325* (2013.01); *H01G 4/248* (2013.01); *H01G 4/30* (2013.01)

(56) References Cited

U.S. PATENT DOCUMENTS

| | | | | |
|---|---|---|---|---|
| 2001/0016252 | A1* | 8/2001 | Nagamoto | H01B 1/16 428/209 |
| 2004/0144962 | A1 | 7/2004 | Hayakawa et al. | |
| 2006/0028788 | A1* | 2/2006 | Sridharan | H01G 4/232 361/523 |
| 2007/0057237 | A1* | 3/2007 | Ohtani | H01B 1/16 252/500 |
| 2011/0007449 | A1* | 1/2011 | Seo | H01G 4/232 361/321.2 |
| 2012/0057272 | A1* | 3/2012 | Hirata | H01G 4/008 361/321.4 |

FOREIGN PATENT DOCUMENTS

| | | |
|---|---|---|
| JP | H09-266129 A | 10/1997 |
| JP | 2003-077336 A | 3/2003 |
| JP | 2004-228075 A | 8/2004 |
| JP | 2005-317432 A | 11/2005 |
| JP | 2005-317776 A | 11/2005 |
| WO | WO 2006/090551 A1 | 8/2006 |

OTHER PUBLICATIONS

Written Opinion of the International Searching Authority issued for PCT/JP2014/072595, dated Dec. 9, 2014.

\* cited by examiner

MULTILAYER CERAMIC ELECTRONIC COMPONENT HAVING AN INORGANIC MATTER AT AN INTERFACE BETWEEN AN EXTERNAL ELECTRODE AND THE CERAMIC BODY

CROSS REFERENCE TO RELATED APPLICATIONS

The present application is a continuation of International application No. PCT/JP2014/072595, filed Aug. 28, 2014, which claims priority to Japanese Patent Application No. 2013-201674, filed Sep. 27, 2013, the entire contents of each of which are incorporated herein by reference.

FIELD OF THE INVENTION

The present invention relates to a multilayer ceramic electronic component, and more specifically to a multilayer ceramic electronic component comprising a ceramic body having a structure having internal electrodes stacked in layers with a ceramic layer interposed and an external electrode disposed in a manner to extend from an end surface of the ceramic body around to a side surface of the ceramic body.

BACKGROUND OF THE INVENTION

One representative ceramic electronic component is a multilayer ceramic capacitor having a structure as shown in FIG. 3 for example.

This multilayer ceramic capacitor is, as shown in FIG. 3, structured such that a stack of ceramic layers (a ceramic body) 60 having a plurality of internal electrodes 52 (52a, 52b) stacked in layers with a ceramic layer 51 that is a dielectric layer interposed has opposite end surfaces 53a and 53b provided with an external electrode 54 (54a, 54b) electrically connected to internal electrode 52 (52a, 52b).

When such a multilayer ceramic capacitor is produced, external electrode 54 (54a, 54b) is formed generally by a method of applying and firing a conductive paste on the opposite end surfaces of the stack of ceramic layers (or the ceramic body).

As such a conductive paste used to form the external electrode, there has been proposed a conductive paste for example containing at least metallic powder and a BaO—SrO—ZnO—$B_2O_3$—$SiO_2$-based glass frit, the glass frit, as converted into oxide, containing 10-50% by weight of BaO, 5-40% by weight of SrO, 10-30% by weight of ZnO, 15-30% by weight of $B_2O_3$ and 3-20% by weight of $SiO_2$, with 0.5-10% by weight of the glass frit contained relative to 100% by weight of the metallic powder (see PTD 1).

It is said that the external electrode formed of this conductive paste has the glass frit less easily permeating through the ceramic that configures the stack of ceramic layers when fired. It is believed that this is because the glass frit used in the conductive paste of PTD 1 has a large content of BaO and SrO and is thus less reactive to the ceramic body.

Furthermore, as another conductive paste, a conductive paste has been proposed that contains at least one conductive powder selected from copper powder, nickel powder, copper-nickel-alloys powder and their mixture, and a glass frit free of lead, bismuth and cadmium and having a softening point of 530 to 650° C. and a coefficient of thermal expansion of 9.0 to 11.5 ppm/° C. with the conductive powder and glass frit dispersed in an organic medium (see PTD 2).

And it is said that the conductive paste of PTD 2 can provide an external electrode having high density and presenting excellent adhesion to the ceramic body.

However, the conductive paste of PTD 1 has a small amount of $SiO_2$ used in the glass frit, and accordingly, the glass contained in the external electrode formed using the conductive paste of PTD 1 is easily dissolved in a plating liquid and in the step of plating the external electrode the plating liquid infiltrates into the external electrode, the ceramic body and the like, resulting in the multilayer ceramic electronic component having disadvantageously reduced mechanical strength.

Furthermore, the conductive paste of PTD 2 also has a problem similar to the above problem described for the conductive paste of PTD 1.

PTD 1: Japanese Patent Laying-Open No. 2003-077336
PTD 2: Japanese Patent Laying-Open No. 2004-228075

SUMMARY OF THE INVENTION

The present invention solves the above problem and it contemplates a highly reliable multilayer ceramic electronic component capable of preventing reduced mechanical strength caused as a plating liquid used to plate an external electrode otherwise infiltrates into the external electrode, a ceramic body and the like.

In order to solve the above problem, the present invention provides a multilayer ceramic electronic component comprising a ceramic body having a structure in which a plurality of internal electrodes are stacked in layers with ceramic layers interposed therebetween; and an external electrode electrically connected to the internal electrodes, and formed at an end of the ceramic body and extending around from an end surface to a side surface of the ceramic body.

At an interface of an edge region of an extending-around portion of the external electrode that extends around to the side surface of the ceramic body and a ceramic configuring a surface of the ceramic body, an inorganic matter is present containing 26 mol % or more and less than 45 mol % of $SiO_2$ and having a molar ratio $(TiO_2+ZrO_2)/(SiO_2+TiO_2+ZrO_2)$ of 0.154 or more.

Furthermore, another multilayer ceramic electronic component of the present invention is a multilayer ceramic electronic component comprising a ceramic body having a structure in which a plurality of internal electrodes are stacked in layers with ceramic layers interposed therebetween; and an external electrode electrically connected to the internal electrodes, and formed at an end of the ceramic body and extending around from an end surface to a side surface of the ceramic body.

At an interface of an edge region of an extending-around portion of the external electrode that extends around to the side surface of the ceramic body and a ceramic configuring a surface of the ceramic body, an inorganic matter is present containing 45 mol % or more of $SiO_2$ and having a molar ratio $(TiO_2+ZrO_2)/(SiO_2+TiO_2+ZrO_2)$ of 0.022 or more.

Furthermore, in the multilayer ceramic electronic component, preferably the inorganic matter present at the interface contains $B_2O_3$ in a molar ratio relative to $SiO_2$ within a range $0.25 \leq B_2O_3/SiO_2 \leq 0.5$.

Defining the molar ratio of the $B_2O_3$ and $SiO_2$ in the inorganic matter present at an interface portion of an edge region of the external electrode and the ceramic configuring the surface of the ceramic body, as described above, can suppress/prevent the crystallization and reduction in acid resistance of the glass present in the interface (hereinafter also simply referred to as the interface of the external electrode's edge region and the ceramic body) and thus ensures that reduction in mechanical strength can be prevented.

Furthermore, in the multilayer ceramic electronic component, preferably the edge region is a region within 10 μm from an edge of the extending-around portion of the external electrode that extends around to the side surface of the ceramic body.

The edge region that is a region within 10 μm from an edge of the extending-around portion of the external electrode as described above ensures the present invention's effect and allows the present invention to be more effective.

Furthermore, preferably the external electrode has a surface having a plating film layer thereon.

A multilayer ceramic electronic component including an external electrode having a surface provided with a plating film layer thereon will be fabricated through a plating step, and as the multilayer ceramic electronic component of the present invention includes the above configuration and has an inorganic matter as described above at an interface of an edge region of an extending-around portion of the external electrode that extends around to a side surface of the ceramic body (i.e., a region experiencing stress and thus easily serving as a point allowing cracking or the like to start therefrom) and the ceramic configuring the surface of the ceramic body, it can suppress elution of a reaction layer of the ceramic and glass present at the interface, the ceramic of the surface of the ceramic body and the like into the plating liquid in the plating step and can suppress infiltration of the plating liquid into the external electrode, the ceramic body and the like, and thus provide a mechanically significantly strong and thus highly reliable multilayer ceramic electronic component.

As has been described above, in the multilayer ceramic electronic component of the present invention, as has been described above, when the interface of the external electrode's edge region and the ceramic body, an inorganic matter is present containing 26 mol % or more and less than 45 mol % of $SiO_2$ and has a molar ratio $(TiO_2+ZrO_2)/(SiO_2+TiO_2+ZrO_2)$ of 0.154 or more, elution of a reaction layer of the ceramic and glass present at the interface of the external electrode's edge region and the ceramic body, the ceramic of the surface of the ceramic body and the like can be suppressed to enhance resistance against plating.

The present invention can thus provide a highly reliable multilayer ceramic electronic component suppressing/preventing reduction in mechanical strength caused as a plating liquid used to plate an external electrode otherwise infiltrates into the external electrode, the ceramic body and the like.

Furthermore, another multilayer ceramic electronic components of the present invention that is made to contain an inorganic matter containing 45 mol % or more of $SiO_2$ at the interface of the external electrode's edge region and the ceramic body and having a molar ratio $(TiO_2+ZrO_2)/(SiO_2+TiO_2+ZrO_2)$ of 0.022 or more, further ensures that elution of a reaction layer of the ceramic and glass present at the interface of the external electrode's edge region and the ceramic body, the ceramic of the surface of the ceramic body and the like can be suppressed to enhance resistance against plating, and can thus provide a mechanically excellently strong and thus highly reliable multilayer ceramic electronic component.

DETAILED DESCRIPTION OF THE PREFERRED EMBODIMENTS

An embodiment of the present invention will be indicated below to more specifically describe what characterizes the present invention.

Embodiment

Figure 1:
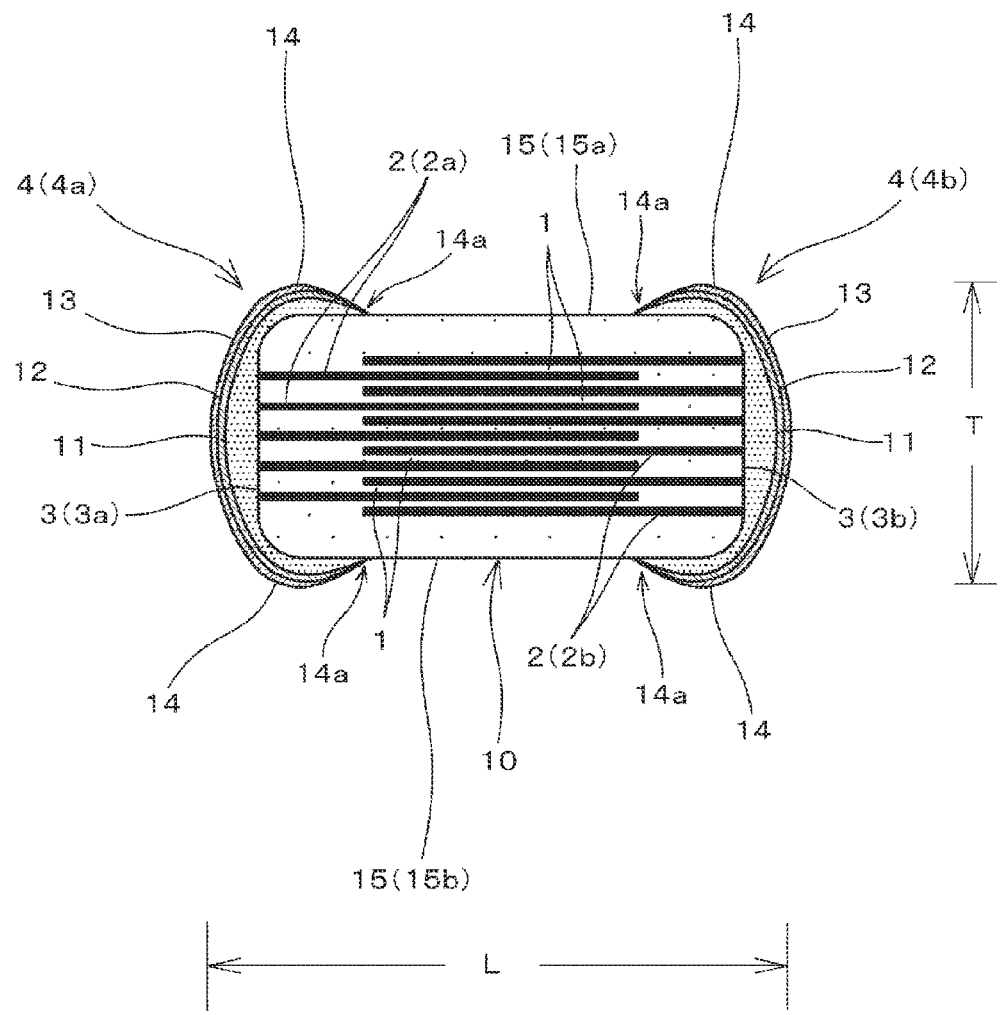
FIG. 1 is a front cross section showing a configuration of a multilayer ceramic capacitor according to an embodiment of the present invention.

In this embodiment a case where a multilayer ceramic capacitor having a structure as shown in FIG. 1 is produced will be described by way of example.

This multilayer ceramic capacitor, as shown in FIG. 1, is structured such that a ceramic body (a multilayer ceramic capacitor element) 10 having a plurality of internal electrodes 2 (2a, 2b) stacked in layers with ceramic layers 1 that are dielectric layers interposed therebetween have opposite end surfaces 3 (3a, 3b) with an external electrode 4 (4a, 4b) disposed thereon such that the external electrode 4 (4a, 4b) is electrically connected to internal electrodes 2 (2a, 2b).

Note that external electrode 4 (4a, 4b) is disposed to extend from opposite end surfaces 3 (3a, 3b) of ceramic body 10 around and thus beyond a ridge portion to four side surfaces 15 (15a,15b) of the ceramic body.

External electrode 4 (4a, 4b), has a multilayer structure including an external electrode body 11 formed of a baked conductive paste, a Ni plating film layer 12 formed on a surface of external electrode body 11, and a Sn plating film layer 13 formed on a surface of Ni plating film layer 12.

Ceramic layer 1 configuring ceramic body 10 of this multilayer ceramic capacitor is formed from a dielectric ceramic having a perovskite structure (in this embodiment, a $BaTiO_3$-based ceramic). Internal electrode 2 (2a, 2b) is a base metal electrode containing Ni as an electrically conducting component.

Next, a method for fabricating this multilayer ceramic electronic component (or multilayer ceramic capacitor) will be described.

[1] Fabrication of Ceramic Body (1) A perovskite type compound containing Ba and Ti as a major component ($BaTiO_3$-based ceramic powder) was mixed with an organic binder, an organic solvent, a plasticizer, and a dispersant at prescribed proportion to prepare a ceramic slurry.

The ceramic slurry was applied on a resin film to thus produce a ceramic green sheet so as to have a thickness of 4.0 μm after being dried.

(2) 50 parts by weight of Ni powder having an average particle diameter of 0.3 μm, 45 parts by weight of a resin solution having 10 parts by weight of ethyl cellulose dissolved in butylcarbitol, and the balance of a dispersant and a thickener were blended together to prepare a conductive paste for forming the internal electrode (an internal electrode paste).

Note that the electrically conducting component that configures the internal electrode paste may be other than Ni powder, and it may be base metal powder, such as a Ni alloy, Cu, and a Cu alloy, as appropriate. Depending on the case, it is also possible to use powder of noble metal such as Ag.

(3) A prescribed number of ceramic green sheets formed in the step (1) were stacked in layers to form an outer layer portion to have a prescribed thickness after being fired, or a lower outer layer portion.

(4) A prescribed number of (in this embodiment, 350) electrode pattern formed ceramic green sheets were stacked in layers on the lower outer layer portion formed in the step (3). The electrode pattern formed ceramic green sheet was formed by applying the conductive paste containing Ni as a conductive component that was prepared in the step (2) (i.e., the internal electrode paste) on a ceramic green sheet that was used in the step (1) by screen printing in a pattern corresponding to the size of the ceramic device after being fired (3.2 mm (in length)×1.6 mm (in width)) such that it had a thickness of 2 µm after being dried.

(5) On the electrode pattern formed ceramic green sheets stacked in layers in the step (4), a prescribed number of sheets were stacked in layers to form an outer layer portion so as to have a prescribed thickness after being fired, to thereby form an upper outer layer portion to thus form an unfired multilayer block.

(6) The unfired multilayer block fabricated in the step (5) was cut at a prescribed position to obtain an unfired ceramic body.

(7) The unfired ceramic body obtained in the step (6) was degreased using a batch furnace in a nitrogen atmosphere at 400° C. for 10 hours, and subsequently fired in an atmosphere of a mixture of nitrogen, hydrogen and water vapor with a top temperature of 1200° C. and a partial pressure of oxygen of $10^{-9}$ to $10^{-10}$ MPa to obtain a fired ceramic body prior to formation of the external electrode.

Note that this ceramic body is a rectangular parallelepiped having dimensions of a length (L): 3.2 mm, a width (W): 1.6 mm, and a thickness (T): 1.6 mm.

[2] Formation of External Electrode (1) As a conductive paste used to form the external electrode, (a) 70 parts by weight of Cu powder, (b) 10 parts by weight of a zinc borosilicate based glass frit adjusted to have $SiO_2$, $TiO_2$, and $ZrO_2$ contents at a ratio indicated in table 1, and (c) 20 parts by weight of a resin solution having 20 parts by weight of ethyl cellulose dissolved in butylcarbitol were dispersed and mixed together to prepare a conductive paste for forming the external electrode.

(2) The conductive paste produced as described above was applied to the ceramic body by immersing the ceramic body in the conductive paste. For example, the external electrode forming conductive paste was applied to a horizontal table by a prescribed thickness, and from thereabove, one end surface side of the ceramic body held with a holding jig was immersed in the paste to thus apply the external electrode paste to the end surface of the ceramic body and a region extending from the end surface around to a side surface of the ceramic body. Note that the external electrode paste was applied in a thickness adjusted so that the conductive paste applied to the end surface of the ceramic body had a thickness of 50 µm after it was dried.

After the applied conductive paste was dried, the other end surface side of the ceramic body was similarly immersed to thus apply the conductive paste to the other end surface of the ceramic body and a region extending from the end surface around to a side surface of the ceramic body.

(3) In order to fire the external electrode forming conductive paste applied on the ceramic body, the ceramic body underwent a heat treatment.

The heat treatment was done with a top temperature (880° C.) and oxygen electromotive force of 280 mV to form a Cu baked electrode (the external electrode body) on the opposite ends of the ceramic body.

Note that in the process of the heat treatment, in order to suppress oxidation of the external electrode, a carrier gas of $N_2$ was used and, at the TOP temperature, $H_2$ was added to the carrier gas ($N_2$) to provide an adjusted atmosphere to provide electromotive force=600 to 900 mV to thus perform firing.

(4) The formed external electrode body was plated with Ni by wet electrolytic plating to form a Ni plating film on a surface of the external electrode, and furthermore, wet electrolytic plating was employed to perform Sn plating to form a Sn plating film on the Ni plating film.

Figure 2:
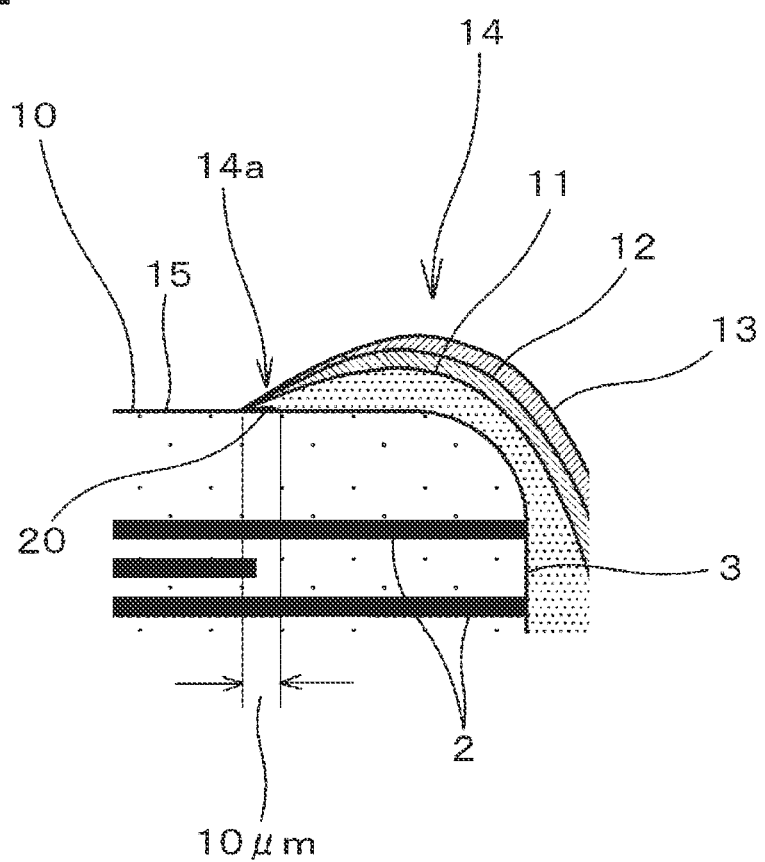
FIG. 2 is an enlarged view of a major portion of the multilayer ceramic capacitor shown in FIG. 1.
Figure 3:
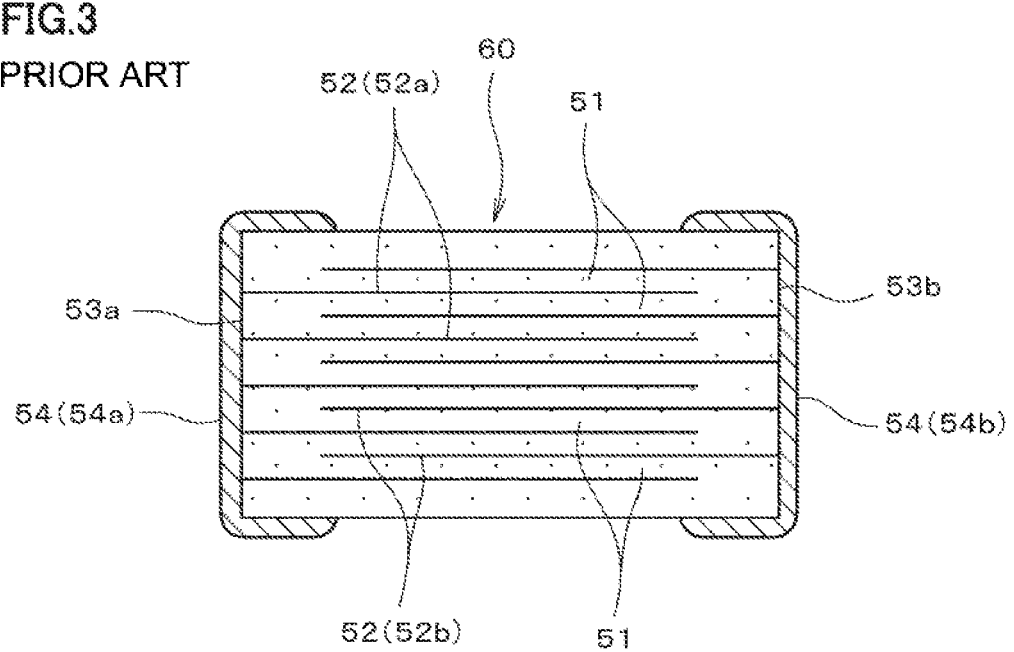
FIG. 3 shows an example of a conventional multilayer ceramic electronic component.

The multilayer ceramic capacitor having the configuration as shown in FIGS. 1 and 2 was thus obtained.

[3] Assessment

The multilayer ceramic capacitor fabricated as described above was subjected to an analysis in composition of an inorganic matter present at an interface of an edge region of an extending-around portion and a transverse test for assessment of its characteristics.

(1) Analysis of the Composition of the Inorganic Matter Present at an Interface of an Edge Region of an Extending-Around Portion Regarding the multilayer ceramic capacitor (a sample) fabricated as described above, as shown in FIG. 2, the composition of an inorganic matter 20 that is present at an interface between an edge region 14a of an extending-around portion 14 of external electrode 4 that extends around to a side surface 15 of ceramic body 10 (hereinafter also simply referred to as "the extending-around portion's edge region") and the ceramic configuring the surface of ceramic body 10, was examined in the following method.

Note that, in this embodiment, as schematically shown in FIG. 2, a region within 10 µm from an edge of extending-around portion 14 of external electrode 4 that extends around to side surface 15 of ceramic body 10 was set as the "extending-around portion's edge region" 14a.

In this embodiment, a focused ion beam (FIB) was used to process a multilayer ceramic capacitor (a sample) at an interface portion of an edge region of the extending-around portion of the external electrode at a center portion of an LW plane defined by length L and width W and the ceramic body, and then TEM-EDS (energy dispersive X-ray spectrometry (EDS) utilizing a transmission electron microscope (TEM)) was employed to quantify an inorganic component, i.e., $B_2O_3$, $SiO_2$, $TiO_2$, and $ZrO_2$ (n=10).

More specifically, the multilayer ceramic capacitor (a sample) shown in FIG. 1 was ground from an LW plane defined by length L and width W to have a dimension in the direction of thickness T to be ½ and thus have an exposed surface, and in that exposed surface a substance present in "the interface of the region within 10 µm from an edge of the extending-around portion of the external electrode and the ceramic body had $B_2O_3$, $SiO_2$, $TiO_2$, and $ZrO_2$ quantified at any 10 locations per sample. Note that in table 1, the values of $B_2O_3$, $SiO_2$, $TiO_2$, and $ZrO_2$ indicate average values.

(2) Measurement of Mechanical Strength (Transverse Test)

The multilayer ceramic capacitor (a sample) fabricated as described above underwent a transverse test by 3-point bending. 20 samples (n=20) underwent the transverse test.

The transverse test was conducted under the following conditions:

(a) a pressing jig moved downward at a speed of: 0.1 [mm/sec]

(b) the pressing jig's radius (R) at a tip: 0.2 [mm]

(c) the pressing jig pressed against the sample at: the center of the ceramic body (d) Number of samples: n=20

As described above, the pressing jig having a tip with a radius of 0.2 mm was used to apply a load to the sample (the multilayer ceramic capacitor) at the center at a speed of 0.1 (mm/sec), and the load when the sample broke was measured as transverse strength.

Table 1 shows a result of quantifying $B_2O_3$, $SiO_2$, $TiO_2$ and $ZrO_2$ at an interface portion (an interface portion of an edge region within 10 μm from an edge of the extending-around portion of the external electrode and the ceramic configuring the surface of the ceramic body), a value of $B_2O_3/SiO_2$ (in molar ratio), a value of $(TiO_2+ZrO_2)/(SiO_2+TiO_2+ZrO_2)$ at the interface portion (in molar ratio), and transverse strength investigated through a transverse test.

Note that in table 1, the sample numbers marked with *, or samples 1-5, are samples which do not satisfy the requirements for the present invention, and the other samples (samples with sample numbers 6-22) are samples which satisfy the requirements for the present invention.

or greater than 0.022 at the interface portion of the edge region within 10 μm from the edge of the extending-around portion of the external electrode and the ceramic configuring the surface of the ceramic body, or samples 11-14 and 19-22, were confirmed to provide multilayer ceramic capacitors having a large transverse strength.

It is believed that this is because when $SiO_2$ is equal to or greater than 45 mol %, $SiO_2$, which is excellent in acid resistance, has a high ratio, and the interface portion's acid resistance was enhanced and the value of $(TiO_2+ZrO_2)/(SiO_2+TiO_2+ZrO_2)$ (in molar ratio) equal to or greater than 0.022 allows sufficient transverse strength.

Furthermore, as indicated by samples with sample numbers 14-22, multilayer ceramic capacitors (samples) presented mechanical strength (transverse strength) varying depending on the ratio of $B_2O_3$ and $SiO_2$ at the interface, and it is believed that this is because the glass present at the interface portion of the edge region within 10 μm from the edge of the extending-around portion of the external elec-

TABLE 1

| sample nos. | amount of $B_2O_3$ at interface (mol %) | amount of $SiO_2$ at interface (mol %) | $B_2O_3/SiO_2$ at interface (mol %) | amount of $TiO_2$ at interface (mol %) | amount of $ZrO_2$ at interface (mol %) | amount of $SiO_2 + TiO_2 + ZrO_2$ at interface (mol %) | $(TiO_2 + ZrO_2)/(SiO_2 + TiO_2 + ZrO_2)$ at interface (mol %) | transverse strength (N) | determination |
|---|---|---|---|---|---|---|---|---|---|
| *1 | 10.0 | 25 | 0.4 | 2 | 2 | 29 | 0.138 | 22 | X |
| *2 | 10.8 | 27 | 0.4 | 2 | 1 | 30 | 0.100 | 23 | X |
| *3 | 12.8 | 32 | 0.4 | 3 | 2 | 37 | 0.135 | 28 | X |
| *4 | 17.6 | 44 | 0.4 | 0 | 1 | 45 | 0.022 | 32 | X |
| *5 | 18 | 45 | 0.4 | 0 | 0 | 45 | 0.000 | 38 | X |
| 6 | 12.8 | 32 | 0.4 | 4 | 2 | 38 | 0.158 | 45 | ○○ |
| 7 | 12.8 | 32 | 0.4 | 6 | 0 | 38 | 0.158 | 49 | ○○ |
| 8 | 12.8 | 32 | 0.4 | 1 | 6 | 39 | 0.179 | 55 | ○○ |
| 9 | 10.4 | 26 | 0.4 | 3 | 2 | 31 | 0.161 | 53 | ○○ |
| 10 | 17.6 | 44 | 0.4 | 6 | 2 | 52 | 0.154 | 50 | ○○ |
| 11 | 18 | 45 | 0.4 | 0 | 1 | 46 | 0.022 | 51 | ○○ |
| 12 | 23.2 | 58 | 0.4 | 2 | 0 | 60 | 0.033 | 53 | ○○ |
| 13 | 24 | 60 | 0.4 | 0 | 2 | 62 | 0.032 | 55 | ○○ |
| 14 | 27.2 | 68 | 0.4 | 2 | 0 | 70 | 0.029 | 55 | ○○ |
| 15 | 5.2 | 26 | 0.2 | 3 | 2 | 31 | 0.161 | 41 | ○ |
| 16 | 6.5 | 26 | 0.25 | 3 | 2 | 31 | 0.161 | 45 | ○○ |
| 17 | 13 | 26 | 0.5 | 3 | 2 | 31 | 0.161 | 47 | ○○ |
| 18 | 15.6 | 26 | 0.6 | 3 | 2 | 31 | 0.161 | 42 | ○ |
| 19 | 13.6 | 68 | 0.2 | 2 | 0 | 70 | 0.029 | 43 | ○ |
| 20 | 17 | 68 | 0.25 | 2 | 0 | 70 | 0.029 | 47 | ○○ |
| 21 | 36 | 68 | 0.5 | 2 | 0 | 70 | 0.029 | 49 | ○○ |
| 22 | 40.8 | 68 | 0.6 | 2 | 0 | 70 | 0.029 | 43 | ○ |

As shown in table 1, samples containing an inorganic matter containing $SiO_2$ in a range of 26 mol % or more and less than 45 mol % and having a value of $(TiO_2+ZrO_2)/(SiO_2+TiO_2+ZrO_2)$ equal to or greater than 0.154 at the interface portion of the edge region within 10 μm from the edge of the extending-around portion of the external electrode and the ceramic configuring the surface of the ceramic body, or samples 6-10 and 15-18, were confirmed to provide multilayer ceramic capacitors having a large transverse strength.

It is believed that this is because when $SiO_2$ was present at a proportion in a range of 26 mol % or more and less than 45 mol %, setting the ratio of $TiO_2$ and $ZrO_2$, which are assumed to enhance acid resistance, to 0.154 or more enhanced elution resistance against Ni plating in the edge region of the extending-around portion of the external electrode, and hence transverse strength.

Furthermore, as shown in table 1, samples containing an inorganic matter containing 45 mol % or more of $SiO_2$ and having a value of $(TiO_2+ZrO_2)/(SiO_2+TiO_2+ZrO_2)$ equal to trode and the ceramic configuring the surface of the ceramic body crystallized or was impaired in acid resistance In other words, it is believed that when the ratio of $B_2O_3/SiO_2$ was 0.2, i.e., in the case of a sample with a sample no. 15, the glass present at the interface portion crystallized and a composition deviation arose in the glass portion at the interface portion, and accordingly the glass was dissolvable in the plating liquid, resulting in reduced transverse strength.

Furthermore, samples having sample nos. 18 and 22 having a ratio of $B_2O_3/SiO_2$ of 0.6 also presented reduced mechanical strength, and it is believed that this is because the glass at the interface portion had a composition having a low resistance against the plating liquid and the glass at the interface portion was dissolved in the plating liquid, resulting in reduced transverse strength.

From the above result, it can be seen that it is more desirable that the ratio of $B_2O_3/SiO_2$ be $0.25 \leq B_2O_3/SiO_2 \leq 0.5$.

In contrast, while samples with sample nos. 1-5 had $SiO_2$ having an amount in a range of 25 to 45 mol % at the interface portion of the edge region within 10 μm from the edge of the extending-around portion of the external electrode and the ceramic configuring the surface of the ceramic body, the samples with sample nos. 1-5 had values of $(TiO_2+ZrO_2)/(SiO_2+TiO_2+ZrO_2)$ (in molar ratio) of 0.000-0.138, which failed to satisfy the requirements for the present invention, and were confirmed to have low transverse strength of 22-38 N.

Note that while the above embodiment has been described with a multilayer ceramic capacitor referred to as an example, the present invention is not limited to the multilayer ceramic capacitor and is also applicable for example to a variety of multilayer ceramic electronic components such as a multilayer type LC composite component, a multilayer varistor and the like including an electrode (an internal electrode) in a ceramic body and an external electrode in such a manner extending from an end surface of the ceramic body around to a side surface thereof.

Furthermore, the present invention is not limited in other points to the above embodiment, either, and is capable of a variety of applications and modifications in the scope of the present invention.

REFERENCE SIGNS LIST 1 ceramic layer
2 (2a, 2b) internal electrode
3 (3a, 3b) end surface of the ceramic body
4 (4a, 4b) external electrode
10 ceramic body
11 external electrode body
12 Ni plating film layer
13 Sn plating film layer
14 extending-around portion
14a edge region of extending-around portion
15 side surface of ceramic body
20 inorganic matter of boundary

The invention claimed is:

1. A multilayer ceramic electronic component comprising:
a ceramic body having a plurality of internal electrodes stacked in layers with ceramic layers interposed therebetween; and
an external electrode electrically connected to the internal electrodes, the external electrode being located at an end surface of the ceramic body and extending around from the end surface to a side surface of the ceramic body,
at an interface of an edge region of the external electrode that extends around to the side surface of the ceramic body and a surface of the ceramic body, an inorganic matter is present containing 26 mol % or more and less than 45 mol % of $SiO_2$ and having a molar ratio $(TiO_2+ZrO_2)/(SiO_2+TiO_2+ZrO_2)$ of 0.154 to 0.161.

2. The multilayer ceramic electronic component according to claim 1, wherein the inorganic matter present at the interface further contains $B_2O_3$ having a molar ratio relative to $SiO_2$ within $0.25 \leq B_2O_3/SiO_2 \leq 0.5$.

3. The multilayer ceramic electronic component according to claim 1, wherein the edge region is within 10 pan from an edge of the external electrode that extends around to the side surface of the ceramic body.

4. The multilayer ceramic electronic component according to claim 1, further comprising a plating film layer on the external electrode.

5. The multilayer ceramic electronic component according to claim 4, wherein the plating film layer has a Ni plating layer.

6. The multilayer ceramic electronic component according to claim 5, wherein the plating film layer has a Sn plating layer on the Ni plating layer.

* * * * *